(12) United States Patent
Anumala (10) Patent No.: US 9,515,873 B2
(45) Date of Patent: Dec. 6, 2016

(54) SYSTEM AND METHOD FOR MANAGEMENT OF VIRTUAL SUB-NETWORKS

(71) Applicant: Dell Products L.P., Round Rock, TX (US)

(72) Inventor: Mohnish Anumala, Cupertino, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 256 days.

(21) Appl. No.: 13/798,041

(22) Filed: Mar. 12, 2013

(65) Prior Publication Data

US 2014/0269295 A1    Sep. 18, 2014

(51) Int. Cl.
   H04L 12/24    (2006.01)
   H04L 12/801   (2013.01)

(52) U.S. Cl.
   CPC ........... H04L 41/08 (2013.01); H04L 47/10 (2013.01)

(58) Field of Classification Search
   USPC .............................................. 370/229–240
   See application file for complete search history.

(56) References Cited

U.S. PATENT DOCUMENTS

| | | | |
|---|---|---|---|
| 2008/0189769 A1* | 8/2008 | Casado et al. | 726/4 |
| 2011/0286359 A1* | 11/2011 | Shimonishi | 370/254 |
| 2013/0223444 A1* | 8/2013 | Liljenstolpe et al. | 370/392 |

OTHER PUBLICATIONS

Sherwood, et al; Flowvisor: A Network Virtualization Layer; Oct. 14, 2009; Openflow-TR-2009-1, pp. 1-14.*
OpenFlow Switch Specification, Version 1.1.0 (2011), available at http://archive.openflow.org/.

* cited by examiner

Primary Examiner — Awet Haile
Assistant Examiner — Kent Krueger
(74) Attorney, Agent, or Firm — Haynes and Boone, LLP (57) ABSTRACT

A system and method for management of virtual sub-networks includes a network controller including a control unit and one or more ports coupled to the control unit. The network controller is configured to receive a first admit request from a network switching device on a first virtual sub-network, form a first admit response based on information associated with the first admit request, transmit the first admit response to the network switching device on the first virtual sub-network, form one or more first flow control messages including configuration information for coupling the network controller and the network switching device using a second virtual sub-network, transmit the one or more first flow control messages, transmit a first migrate message to the network switching device, and exchange management traffic with the network switching device using the second virtual sub-network.

20 Claims, 4 Drawing Sheets

SYSTEM AND METHOD FOR MANAGEMENT OF VIRTUAL SUB-NETWORKS

BACKGROUND

The present disclosure relates generally to information handling systems, and more particularly to management of virtual sub-networks.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information as network configurations change. Cooperation among the network switching products may also be important.

Accordingly, it would be desirable to provide improved systems and methods for managing network switching products.

SUMMARY

According to one embodiment, a network controller includes a control unit and one or more ports coupled to the control unit. The network controller is configured to receive a first admit request on the one or more ports from a first network switching device on a first virtual sub-network, form a first admit response based on information associated with the first admit request, transmit the first admit response on the one or more ports to the first network switching device on the first virtual sub-network, form one or more first flow control messages including configuration information for coupling the network controller and the first network switching device using a second virtual sub-network, transmit the one or more first flow control messages on the one or more ports, transmit a first migrate message on the one or more ports to the first network switching device, and exchange management traffic with the first network switching device using the second virtual sub-network.

According to another embodiment, a network switching device includes a control unit and one or more ports coupled to the control unit. The network switching device is configured to transmit an admit request on the one or more ports to a network controller on a first virtual sub-network, receive an admit response on the one or more ports from the network controller on the first virtual sub-network, receive a migrate message on the one or more ports from the network controller, and exchange management traffic with the network controller using the second virtual sub-network.

According to yet another embodiment, a method of managing networks includes receiving a first admit request on one or more ports from a first network switching device on a first virtual sub-network, forming a first admit response based on information associated with the first admit request, transmitting the first admit response on the one or more ports to the first network switching device on the first virtual sub-network, forming one or more first flow control messages including configuration information for a second virtual sub-network coupled to the first network switching device, transmitting the one or more first flow control messages on the one or more ports, transmitting a first migrate message on the one or more ports to the first network switching device, and exchanging management traffic with the first network switching device using the second virtual sub-network.

According to yet another embodiment, an information handling system includes a network. The network includes a network controller. The network controller includes a control unit and one or more ports coupled to the control unit. The network controller is configured to receive an admit request on the one or more ports from a network switching device on a first virtual sub-network, form an admit response based on information associated with the first admit request, transmit the admit response on the one or more ports to the network switching device on the first virtual sub-network, form one or more flow control messages including configuration information for coupling the network controller and the network switching device using a second virtual sub-network, transmit the one or more flow control messages on the one or more ports, transmit a migrate message on the one or more ports to the network switching device, and exchange management traffic with the network switching device using the second virtual sub-network.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
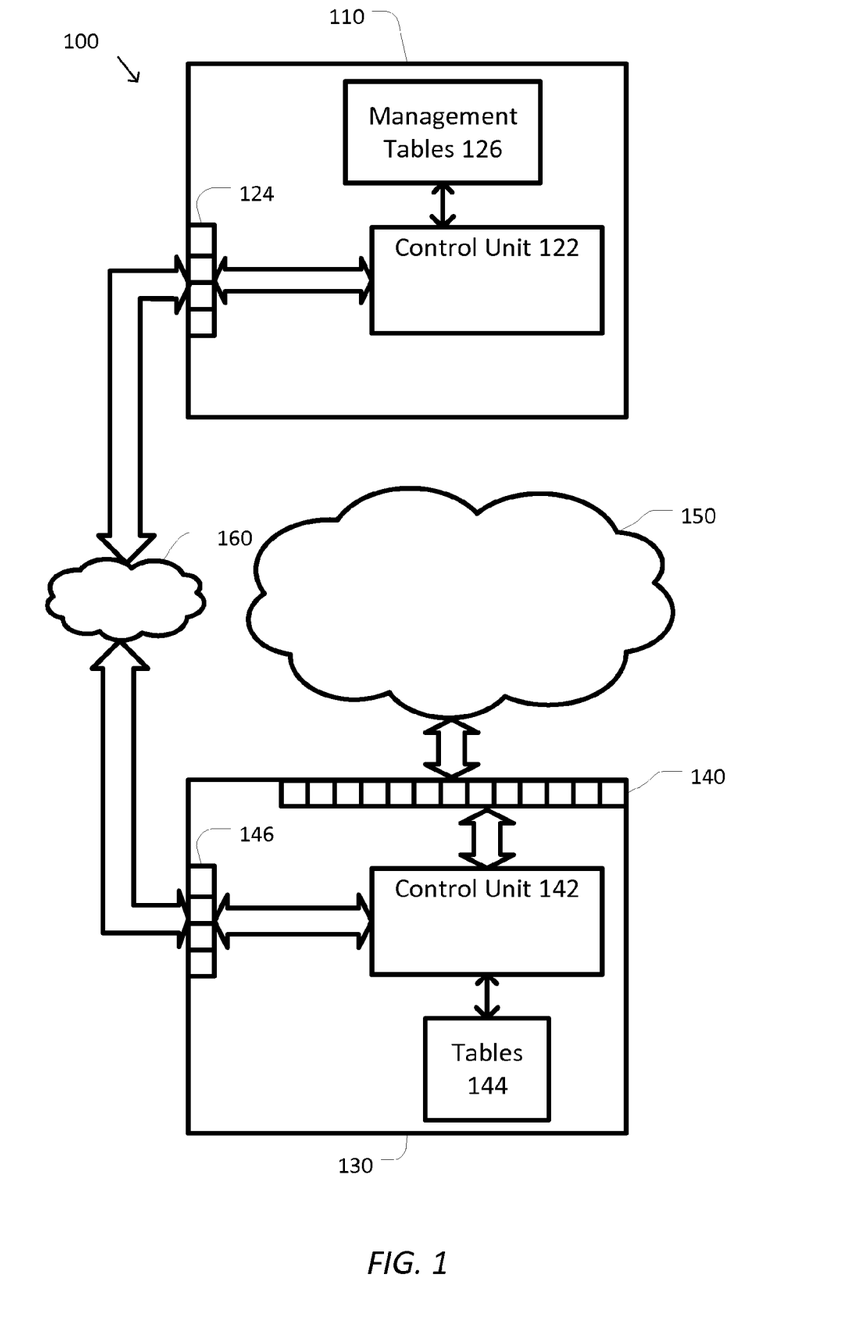
FIG. 1 is a simplified diagram of a network with separate physical sub-networks according to some embodiments.

FIG. 1 is a simplified diagram of a network 100 with separate physical sub-networks according to some embodiments. As shown in FIG. 1, the network 100 includes a network controller 110. Network controller 110 includes a control unit 122. In some examples, the control unit 122 may manage and/or control the operation of the network controller 110. Network controller 110 further includes one or more ports 124 for coupling network controller 110 to other network switching devices and/or network devices for transmitting and receiving management traffic between the network controller 110 and the other network switching devices and/or network devices. In some examples, the control unit 122 may use the one or more ports 124 to transmit and receive the management traffic. In some examples, control unit 122 may include one or more processors.

As shown in FIG. 1, network controller 110 is operating as a master controller and/or a managing controller for the network 100. Thus, the network controller 110 further includes management tables 126. In some examples, the management tables 126 may be used by network controller 110 and/or control unit 122 to store information regarding the configuration of other devices in the network 100. In some examples, the management tables 126 may include provisioning information for the other devices. In some examples, the management tables 126 may be stored in memory coupled with the network controller 110 and/or the control unit 122. In some examples, the management tables 126 may include one or more tables. In some examples, the management tables 126 may be implemented using data structures other than tables and/or using databases. In some examples, some or all of the management tables 126 may be transmitted and/or received using the one or more ports 124. In some examples, the network controller 110 may be an OpenFlow controller. In some examples, the network controller 110 may be a software defined networking (SDN) managing controller.

The network 100 further includes a network switching device or switch 130. Switch 130 includes one or more ports 140 for coupling switch 130 to other network switching devices and/or network devices for transmitting and receiving network traffic. Switch 130 includes a control unit 142 and one or more forwarding information tables 144. In some examples, the control unit 142 may manage and/or control the operation of the switch 130. In some examples, control unit 142 may include one or more processors. In some examples, the control unit 142 may maintain and/or update the one or more forwarding information tables 144. In some examples, the one or more forwarding information tables 144 may include virtual LAN (VLAN) tables, media access control (MAC) tables, layer 3 (L3) tables, layer 3 forwarding information bases, access control lists (ACLs), flow processing (FP) tables, and/or the like. In some examples, the one or more forwarding information tables 144 may be stored in memory coupled with the switch 130 and/or the control unit 142. In some examples, the one or more forwarding information tables 144 may be implemented using data structures other than tables and/or using databases.

Switch 130 further includes one or more ports 146 for coupling switch 130 to network controller 110 for transmitting and receiving management traffic between the switch 130 and the network controller 110. In some examples, the control unit 142 may use the one or more ports 146 to transmit and receive the management traffic. As shown in FIG. 1, switch 130 is operating as a slave switch and/or a non-managing switch for the network 100.

The network 100 may further include additional network switching devices and/or network devices coupled together using network links. FIG. 1 shows that these additional network switching devices, network devices, and/or network links may be separated into separate physical sub-networks 150 and 160. In some examples, this may be referred to a "ships-in-the-night" model. Sub-network 150 may be used to couple switch 130 to the additional network switching devices and/or network devices. Sub-network 150 may typically be used to forward network traffic between and among switch 130 and the additional network switching devices and/or network devices. In some examples, the network traffic may be associated with one or more applications, users, and/or devices that desire to share information and/or data using the network 100.

In contrast, management sub-network 160 may be used to couple network controller 110 and switch 130 to each other as well as to couple network controller 110 to the additional network switching devices and/or network devices for the purposes of transmitting and receiving management traffic. In some examples, network controller 110 may use management sub-network 160 to exchange management traffic with other devices, such as the switch 130. The use of a separate management sub-network 160 may provide one or more advantages to the network 100. In some examples, the separate management sub-network 160 may provide additional security to the management traffic. Keeping management traffic on the separate management sub-network 160 may limit opportunities for unwanted snooping of management traffic. Keeping management traffic on the separate management sub-network 160 may reduce the likelihood of injection of unauthorized management traffic into the network 100. In some examples, the separate management sub-network 160 may reduce congestion in the sub-network 150. Transmitting and receiving management traffic only on the separate management sub-network 160 prevents the management traffic from using bandwidth that may be needed for the network traffic.

The use of the separate management sub-network 160 may also have disadvantages. In some examples, maintenance of the separate management sub-network 160 may increase a cost and/or a complexity of switch 130 and network 100. In order to support the separate management sub-network 160, switch 130 must include the one or more ports 146 that are separate from the one or more ports 140. The network 100 must also include separate network links to implement the separate management sub-network 160. In some examples, the separate management sub-network 160 may be inefficient. When there is a limited amount of management traffic for the separate management sub-network 160, any remaining bandwidth in the separate sub-network cannot easily be used to reduce congestion in the sub-network 150. In some examples, the separate management sub-network 160 may lack the flexibility of the sub-network 150. Even though the sub-network 150 may support a flexible configuration, this is not always the case for the separate management sub-network 160.

Figure 2:
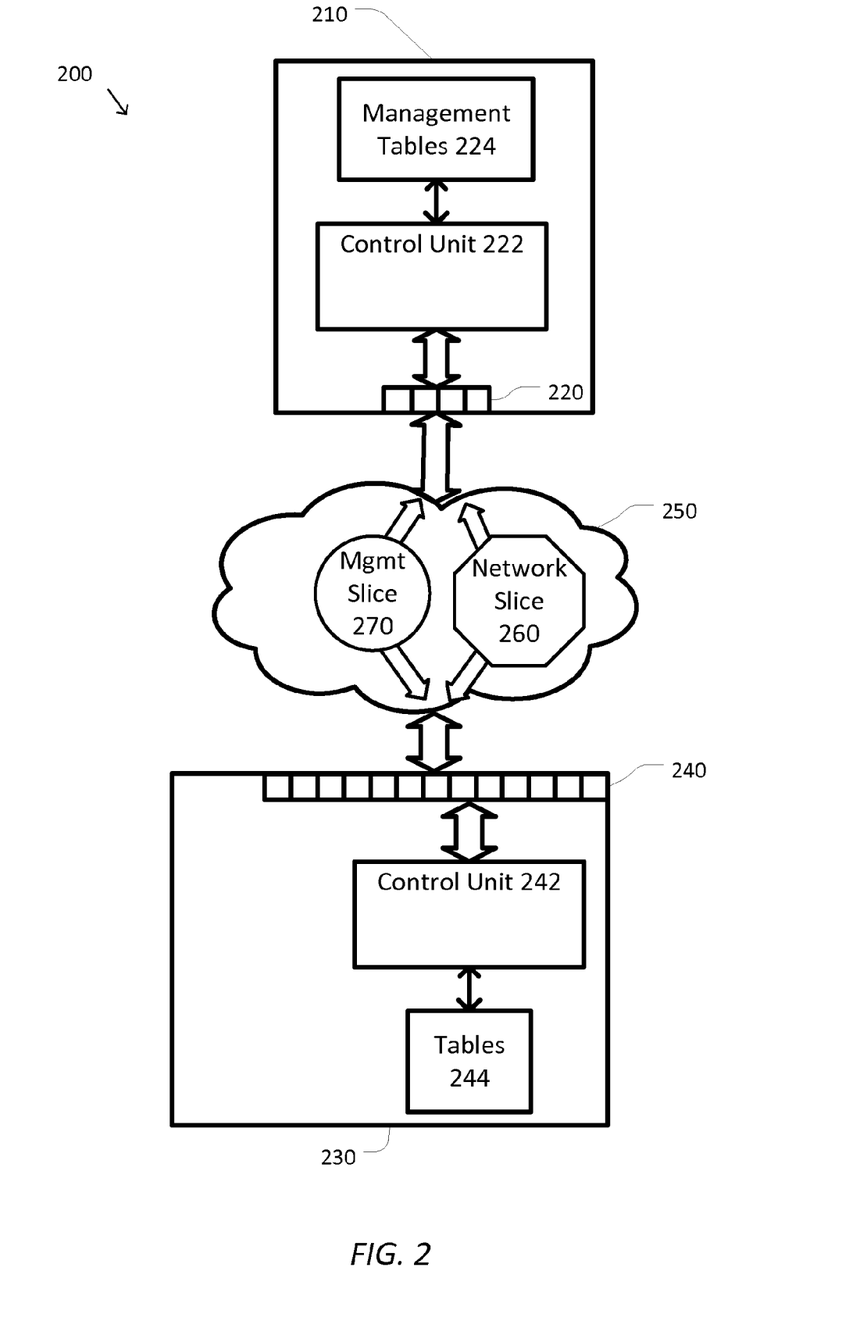
FIG. 2 is a simplified diagram of a network with virtual sub-networks according to some embodiments.

FIG. 2 is a simplified diagram of a network 200 with virtual sub-networks according to some embodiments. As shown in FIG. 2, the network 200 includes a network controller 210. Network controller 210 includes one or more ports 220 for coupling network controller 210 to other network switching devices and/or network devices for transmitting and receiving network traffic. Network controller 210 includes a control unit 222. In some examples, the control unit 222 may manage and/or control the operation of the network controller 210. In some examples, control unit 222 may include one or more processors.

As shown in FIG. 2, network controller 210 is operating as a master controller and/or a managing controller for the network 200. Thus, the network controller 210 further includes management tables 224. In some examples, the management tables 224 may be used by network controller 210 and/or control unit 222 to store information regarding the configuration of other devices in the network 200. In some examples, the management tables 224 may include provisioning information for the other devices. In some examples, the management tables 224 may be stored in memory coupled with the network controller 210 and/or the control unit 222. In some examples, the management tables 224 may include one or more tables. In some examples, the management tables 224 may be implemented using data structures other than tables and/or using databases.

The network 200 further includes a network switching device or switch 230. Switch 230 includes one or more ports 240 for coupling switch 230 to managing controller 210 as well as other network switching devices and/or network devices for transmitting and receiving network traffic. Switch 230 includes a control unit 242 and one or more forwarding information tables 244. In some examples, the control unit 242 may manage and/or control the operation of the switch 230. In some examples, control unit 242 may include one or more processors. In some examples, the control unit 242 may maintain and/or update the one or more forwarding information tables 244. In some examples, the one or more forwarding information tables 244 may include virtual LAN (VLAN) tables, media access control (MAC) tables, layer 3 (L3) tables, layer 3 forwarding information bases, access control lists (ACLs), flow processing (FP) tables, and/or the like. In some examples, the one or more forwarding information tables 244 may be stored in memory coupled with the switch 230 and/or the control unit 242. In some examples, the one or more forwarding information tables 244 may be implemented using data structures other than tables and/or using databases.

As shown in FIG. 2, switch 230 is operating as a slave switch and/or a non-managing switch for the network 200. In some examples, switch 230 may exchange management traffic with a master switch (e.g., the network controller 210).

The network 200 may further include additional network switching devices and/or network devices coupled together using network links. In FIG. 2, these additional network switching devices, network devices, and/or network links are included in a physical sub-network 250. Sub-network 250 may be used to couple managing controller 210 and switch 230 to each other as well as to couple managing controller 210 and switch 230 to the additional network switching devices and/or network devices. In some examples, sub-network 250 may include one or more virtual sub-networks or slices: a network slice 260 and a management slice 270. Although FIG. 2 shows sub-network 250 with only two slices, more than two slices are possible.

In some examples, network slice 260 may be used to forward network traffic between and among managing controller 210 and switch 230 as well as the additional network switching devices and/or network devices. In some examples, the network traffic may be associated with one or more applications, users, and/or devices that desire to share information and/or data using the network 200. In some examples, management slice 270 may be used to couple managing controller 210 and switch 230 to each other as well as to couple managing controller 210 to the additional network switching devices and/or network devices for the purposes of transmitting and receiving management traffic. In some examples, network controller 210 may use management slice 270 to exchange management traffic with other devices, such as the switch 230.

According to some embodiments, one of several protocols may be used to create the virtual sub-networks or slices 260 and 270 in the sub-network 250. In some examples, when both managing controller 210 and switch 230, as well as the additional network switching devices and/or network devices in the sub-network 250 support OpenFlow, network controller 210 may transmit flow control messages to switch 230, the additional network switching devices, and/or the additional network devices creating separate handling for management traffic and network traffic. In some examples, virtual routing and forwarding (VRF) may be used to create multiple versions of forwarding information tables (e.g., the one or more forwarding information tables 244) so that management traffic and network traffic, each using different address sets, may be handled using different strategies. In some examples, network controller 210 may transmit provisioning and/or flow control messages to create the multiple versions of the forwarding information tables. In some examples, SDN may be used to create the separate slices 260 and 270. In some examples, network controller 210 may be a SDN managing controller. In some examples, as the SDN managing controller, network controller 210 may transmit flow control messages. In some examples, the network slice 260 may be created by default in the sub-network 250.

According to some embodiments, the network slice 260 and the management slice 270 may support separate forwarding and/or processing. In some examples, management traffic transmitted and forwarded using the management slice 270 may include security. In some examples, the management traffic may be encrypted. In some examples, only the network controller 210 and the destination switch (e.g., slave switch 230) may be able to decrypt management traffic being exchanged among themselves. In some examples, management traffic on the management slice 270 may be forwarded using a different path than network traffic on the network slice 260 with the same source and destination. In some examples, the slices 260 and/or 270 may be reconfigured by the network controller 210 based on changing conditions in the network 200.

According to some embodiments, use of the sub-network 250 with slices 260 and 270 in the network 200 may have several advantages over the separated sub-networks 150 and 160 in the network 100. In some examples, use of only one sub-network 250 may eliminate the need for the costly separate management sub-network 160. In some examples, use of the management slice 270 in sub-network 250 may allow management slice 270 to use a flexible configuration in the sub-network 250. In some examples, use of the management slice 270 in sub-network 250 may avoid the inefficient use of bandwidth in an under-utilized separate management sub-network. According to some embodiments, the ability to support security in the management slice 270 may provide adequate security to the management traffic.

Figure 3:
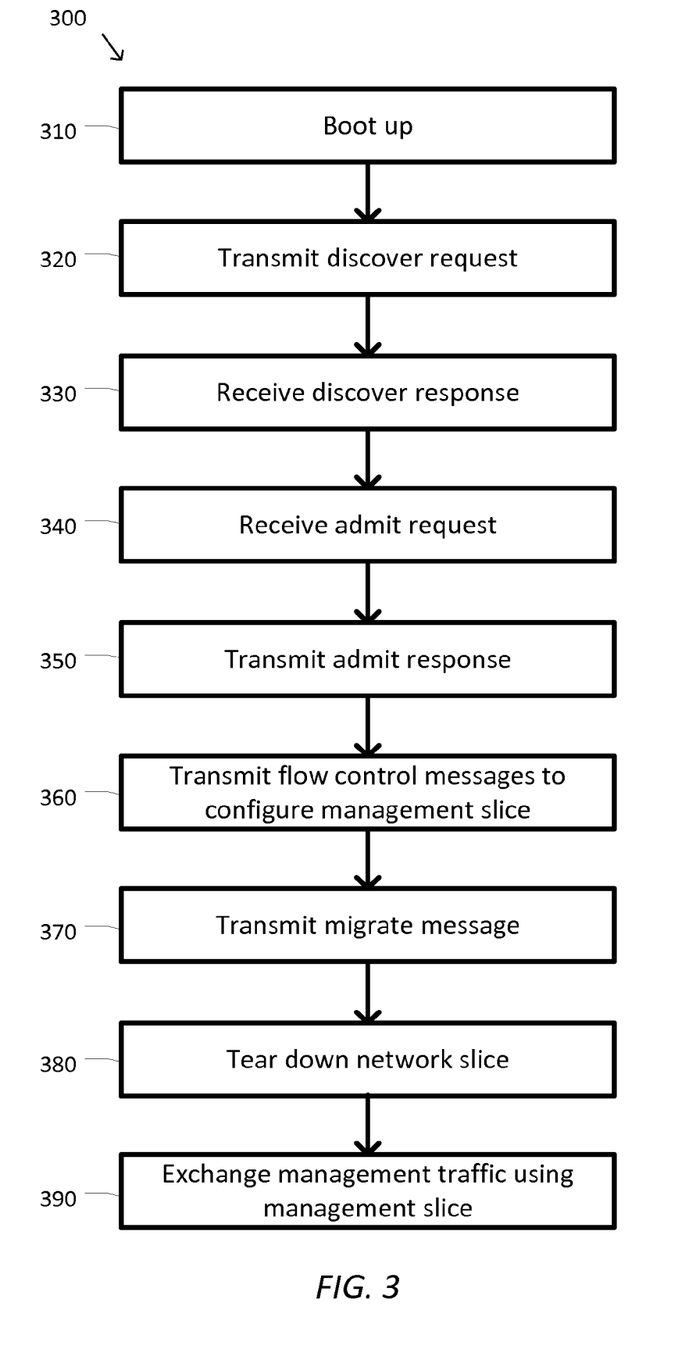
FIG. 3 is a simplified diagram showing a method of network switching device management using virtual sub-networks or slices according to some embodiments.

FIG. 3 is a simplified diagram showing a method 300 of network switching device management using virtual sub-networks or slices according to some embodiments. As shown in FIG. 3, the method 300 includes a process 310 for boot up, a process 320 for transmitting a discover request, a process 330 for receiving a discover response, a process 340 for receiving an admit request, a process 350 for transmitting an admit response, a process 360 for transmitting flow control messages to configure a management slice, a process 370 for transmitting a migrate message, a process 380 for tearing down a network slice, and a process 390 for exchanging management traffic using the management slice. According to certain embodiments, the method 300 of network switching device management using virtual sub-networks or slices can be performed using variations among the processes 310-390 as would be recognized by one of ordinary skill in the art. In some embodiments, one or more of the process 310, 320, 330, and 380 may be omitted. In some embodiments, one or more of the processes 310-390 of method 300 may be implemented, at least in part, in the form of executable code stored on non-transient, tangible, machine readable media that when run by one or more processors (e.g., one or more processors in the switches 210 and/or 230) may cause the one or more processors to perform one or more of the processes 310-390.

At the optional process 310, boot up occurs. During boot up, a network controller, such as the network controller 210, restarts and may begin the configuration and/or provisioning process.

At the optional process 320, a discover request is transmitted. The discover request may be transmitted by the network controller. In some examples, during or just after boot up, the network controller may be unaware of its desired configuration and may transmit the discover request to a server. In some examples, the server may be a Dynamic Host Configuration Protocol (DHCP) server. In some examples, the server may be an Address Resolution Protocol (ARP) server. In some examples, the network controller may broadcast the discover request. In some examples, the network controller transmits the discover request to the server using a network slice. In some examples, the network slice may be the network slice 260. In some examples, the network slice may be a default slice that may be accessed by the network controller during configuration and/or provisioning.

At the optional process 330, a discover response is received. The discover response may be received by the network controller. In some examples, when the discover request is a DCHP discovery request, the discover response is a DHCP offer. In some examples, when the discover request is an ARP request, the discover response is an ARP response. In some examples, the discover response may include provisioning information. In some examples, the network controller may use the provisioning information to provision itself. In some examples, the provisioning information may include a network address for the network controller. In some examples, the network address may be an address for use on the network slice. In some examples, the provisioning information may indicate that the network controller is a master and/or managing network controller.

At the process 340, an admit request is received. The admit request may be received by the network controller. In some examples, an admit request may be a request by a slave and/or non-managing network switching device (e.g., switch 230) to be granted access to a management slice (e.g., management slice 270). In some examples, the admit request may be a logon request. In some examples, the admit request may include credentials for the slave and/or non-managing network switching device. In some examples, the admit request may be a request for provisioning information necessary for the slave and/or non-managing network switching device to access and use the management slice. In some examples, the admit request may be received on the network slice.

At the process 350, an admit response is transmitted. The admit response may be transmitted by the network controller. In some examples, the admit response may be used by the network controller to acknowledge the admit request received during the process 340. In some examples, the admit response may only be transmitted when the admit request received during the process 340 includes credentials that validate an identity of the slave and/or non-managing network switching device. In some examples, the admit response may include an alternate address for the slave and/or non-managing network switching device. In some examples, the alternate address may be an address for use on the management slice. In some examples, the admit response may be transmitted on the network slice.

At the process 360, flow control messages are transmitted to configure the management slice. In some examples, the flow control messages may be transmitted by the network controller to one or more corresponding network switching devices between the network controller and the slave and/or non-managing network switching device. In some examples, one or more of the flow control messages may be transmitted to the slave and/or non-managing network switching device. In some examples, the flow control messages may specify security processing for any traffic on the management slice.

In some examples, the flow control messages may be associated with the alternate address used during the process 350. In some examples, the flow control messages may configure the management slice. In some examples, the flow control messages may configure only a portion of the management slice to add the slave and/or non-managing network switching device to the management slice. In some examples, some or all of the flow control messages may be transmitted on the network slice. In some examples, some or all of the flow control messages may be transmitted on the management slice.

At the process 370, a migrate message is transmitted. The migrate message may be transmitted by the network controller. In some examples, the migrate message may tell the slave and/or non-managing network switching device that any future management traffic between the network controller and the slave and/or non-managing network switching device should be exchanged using the management slice. In some examples, the migrate message may be transmitted on the network slice. In some examples, the migrate message may be transmitted on the management slice.

At the optional process 380, the network slice is torn down. In some examples, when the network controller determines that that default network slice may no longer be needed, the network controller may tear down the network slice. In some examples, the network controller may transmit one or more flow control messages to one or more corresponding network switching devices between the network switching device and the slave and/or non-managing network switching device and/or to the slave and/or non-managing network switching device to remove any flow control entries that implement the network slice. In some examples, some or all of the flow control messages may be transmitted on the network slice. In some examples, some or all of the flow control messages may be transmitted on the management slice.

At the process 390, management traffic is exchanged using the management slice. Once the management slice is provisioned, the network controller and the slave and/or non-managing network switching device may exchange management traffic using the management slice.

As discussed above and further emphasized here, FIG. 3 is merely an example, which should not unduly limit the scope of the claims. One of ordinary skill in the art would recognize many variations, alternatives, and modifications. According to some embodiments, the method 300 may further include processes for monitoring a status of the management slice and transmitting additional flow control messages based on the status of the management slice. In some examples, the management slice may be reconfigured to avoid network failures and/or congestion.

Figure 4:
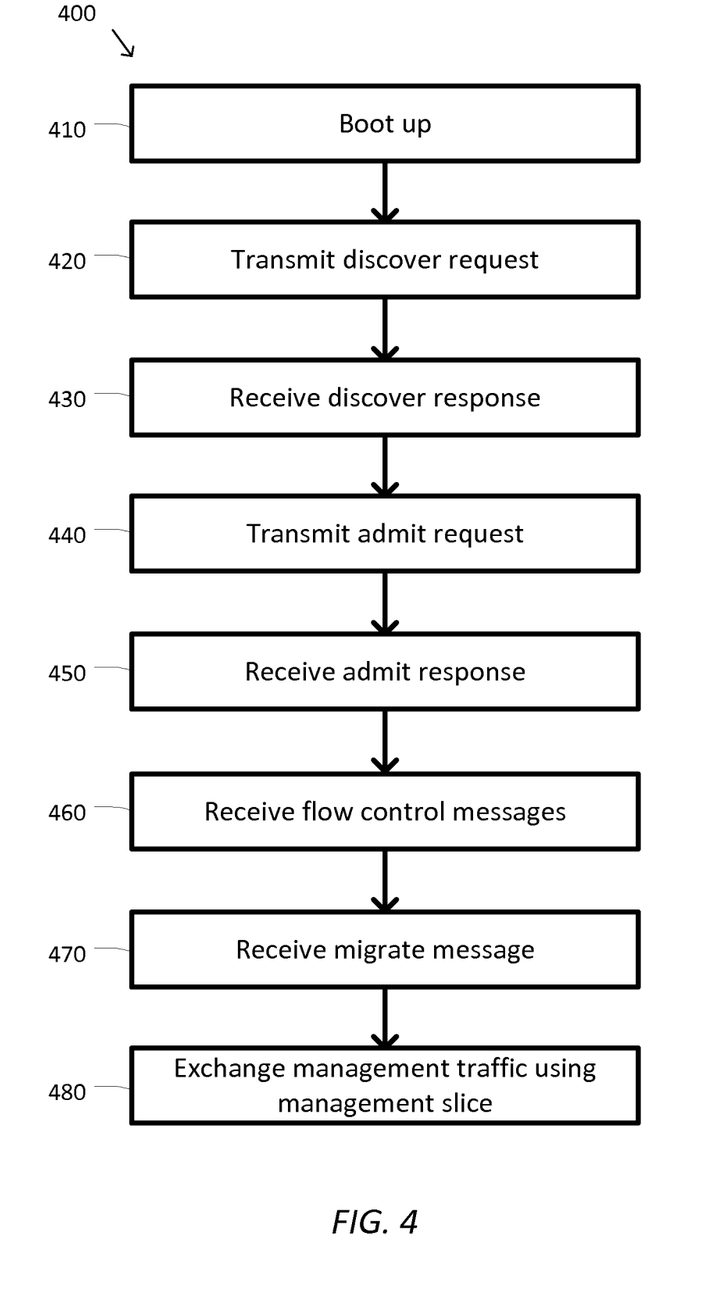
FIG. 4 is a simplified diagram showing a method of network switching device management using virtual sub-networks or slices according to some embodiments.

FIG. 4 is a simplified diagram showing a method 400 of network switching device management using virtual sub-networks or slices according to some embodiments. As shown in FIG. 4, the method 400 includes a process 410 for boot up, a process 420 for transmitting a discover request, a process 430 for receiving a discover response, a process 440 for transmitting an admit request, a process 450 for receiving an admit response, a process 460 for receiving flow control messages, a process 470 for receiving a migrate message, and a process 480 for exchanging management traffic using the management slice. According to certain embodiments, the method 400 of network switching device management using virtual sub-networks or slices can be performed using variations among the processes 410-480 as would be recognized by one of ordinary skill in the art. In some embodiments, one or more of the processes 410, 420, 430, and 460 may be omitted. In some embodiments, one or more of the processes 410-480 of method 400 may be implemented, at least in part, in the form of executable code stored on non-transient, tangible, machine readable media that when run by one or more processors (e.g., one or more processors in the switches 210 and/or 230) may cause the one or more processors to perform one or more of the processes 410-480.

At the optional process 410, boot up occurs. During boot up, a network switching device, such as the slave and/or non-managing switch 230, restarts and may begin the configuration and/or provisioning process.

At the optional process 420, a discover request is transmitted. The discover request may be transmitted by the network switching device. In some examples, during or just after boot up, the network switching device may be unaware of its desired configuration and may transmit the discover request to a server. In some examples, the server may be a DHCP server. In some examples, the server may be an ARP server. In some examples, the network switching device may broadcast the discover request. In some examples, the network switching device transmits the discover request to the server using a network slice. In some examples, the network slice may be the network slice 260. In some examples, the network slice may be a default slice that may be accessed by the network switching device during configuration and/or provisioning.

At the optional process 430, a discover response is received. The discover response may be received by the network switching device. In some examples, when the discover request is a DCHP discovery request, the discover response is a DHCP offer. In some examples, when the discover request is an ARP request, the discover response is an ARP response. In some examples, the discover response may include provisioning information. In some examples, the network switching device may use the provisioning information to provision itself. In some examples, the provisioning information may include a network address for the network switching device. In some examples, the network address may be an address for use on the network slice. In some examples, the provisioning information may indicate that the network switching device is a slave and/or non-managing network switching device. In some examples, the discover response may include provisioning information for more than one network switching device. In some examples, the network switching device may forward some or all of the provisioning information to other network switching devices. In some examples, the discover response may be received on the network slice.

At the process 440, an admit request is transmitted. The admit request may be transmitted by the network switching device. In some examples, an admit request may be a request by the network switching device (e.g., switch 230) to be granted access to a management slice (e.g., management slice 270). In some examples, the admit request may be transmitted to a master and/or managing network controller (e.g., network controller 210). In some examples, the admit request may be a logon request. In some examples, the admit request may include credentials for the network switching device. In some examples, the admit request may be a request for provisioning information necessary for the network switching device to access and use the management slice. In some examples, the admit request may be transmitted on the network slice.

At the process 450, an admit response is received. The admit response may be received by the network switching device. In some examples, the admit response may be used by the network switching device to receive acknowledgment of the admit request transmitted during the process 440. In some examples, the admit response may be received from the master and/or managing network controller. In some examples, the admit response may have been transmitted by the master and/or managing network controller during the process 350. In some examples, the admit response may only be received when the admit request transmitted during the process 440 includes credentials that validate an identity of the network switching device. In some examples, the admit response may include an alternate address for the network switching device. In some examples, the alternate address may be an address for use on the management slice. In some examples, the admit response may be received on the network slice.

At the optional process 460, flow control messages may be received. In some examples, the flow control messages may be received from the master and/or managing network controller. In some examples, the flow control messages may have been transmitted by the master and/or managing network controller during the process 360. In some examples, the flow control messages may configure and/or provision the network switching device for use of the management slice. In some examples, the flow control messages may specify security processing for any traffic on the management slice. In some examples, the flow control messages may be associated with the alternate address received during the process 450. In some examples, the network switching device may use the flow control messages to update one or more forwarding information tables (e.g., the one or more forwarding information tables 244). In some examples, some or all of the flow control messages may be received on the network slice. In some examples, some or all of the flow control messages may be received on the management slice.

At the process 470, a migrate message is received. The migrate message may be received by the network switching device. In some examples, the migrate message may tell the network switching device that any future management traffic between the network switching device and the master and/or managing network controller should be exchanged using the management slice. In some examples, the migrate message may have been transmitted by the master and/or managing network controller during the process 370. In some examples, the migrate message may be received on the network slice. In some examples, the migrate message may be received on the management slice.

At the process 480, management traffic is exchanged using the management slice. Once the management slice is provisioned, the network switching device and the master and/or managing network controller may exchange management traffic using the management slice.

Some embodiments of network controller 210 and/or switch 230 may include non-transient, tangible, machine readable media that include executable code that when run by one or more processors may cause the one or more processors to perform the processes of methods 300 and/or 400 as described above. Some common forms of machine readable media that may include the processes of methods 300 and/or 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A network controller comprising:
a controller unit; and
one or more ports coupled to the control unit;
the network controller configured to:
receive, from a first network switching device, an admit request on the one or more ports from the first network switching device on a network slice of a physical sub-network, wherein the admit request includes a request for access to a management slice of the physical sub-network and wherein the first network device comprises a slave or non-managing network switching device;
form one or more flow control messages including configuration information for adding the first network switching device to the management slice;
transmit, to one or more second network switching devices coupled between the network controller and the first network switching device, the one or more flow control messages on the one or more ports, wherein the one or more flow control messages update a portion of the management slice corresponding to the one or more second network switching devices to add the first network switching device to the management slice, and do not update any other portion of the management slice;
transmit a migrate message on the one or more ports to the first network switching device, the migrate message instructing the first network switching device to exchange management traffic using the management slice of the physical sub-network; and
exchange management traffic with the first network switching device using the management slice of the physical sub-network.

2. The network controller of claim 1 wherein the network controller is further configured to:
boot up;
transmit a discover request on the one or more ports to a server; and
receive a discover response on the one or more ports from the server.

3. The network controller of claim 2 wherein the server is selected from a group consisting of a DHCP server and an ARP server.

4. The network controller of claim 1 wherein the one or more flow control messages are compatible with one or more selected from a group consisting of OpenFlow, virtual routing and forwarding, and software defined networking.

5. The network controller of claim 1 wherein the admit request includes a logon request for the management slice of the physical sub-network.

6. The network controller of claim 1 wherein the network controller is further configured to:
validate credentials included in the admit request;
form an admit response based on information associated with the admit request; and transmit the admit response on the one or more ports to the first network switching device on the network slice of the physical sub-network only when the credentials are valid.

7. The network controller of claim 6, wherein the admit response includes an address associated with the first network switching device and the management slice of the physical sub-network.

8. The network controller of claim 1 wherein the network controller is further configured to:
monitor status of the management slice of the physical sub-network; and
transmit one or more second flow control messages on the one or more ports based on information associated with the monitored status.

9. The network controller of claim 1 wherein the network controller is further configured to tear down the network slice of the physical sub-network after the migrate message is transmitted.

10. A network switching device operating as a slave or non-managing network switching device comprising:
a control unit; and
one or more ports coupled to the control unit;
the network switching device being configured to:
transmit an admit request on the one or more ports to a network controller on a network slice of a physical sub-network, wherein the admit request includes a request for access to a management slice of the physical sub-network;
receive a migrate message on the one or more ports from the network controller, the migrate message instructing the first network switching device to exchange management traffic using the management slice of the physical sub-network, wherein the migrate message indicates that one or more second network switching devices between the network controller and the network switching device have been updated by the network controller to add the network switching device to the management slice; and
exchange management traffic with the network controller using the management slice of the physical sub-network, the management slice of the physical sub-network being used by the network controller to exchange management traffic with at least one other network switching device.

11. The network switching device of claim 10 wherein the network slice of the physical sub-network is a default virtual sub-network for the network switching device.

12. The network switching device of claim 10 wherein the network switching device is further configured to receive an admit response on the one or more ports from the network controller on the network slice of the physical sub-network, the admit response including an address for the network switching device on the management slice of the physical sub-network.

13. The network switching device of claim 10 wherein the network switching device is further configured to:
boot up;
transmit a discover request on the one or more ports to a server; and
receive a discover response on the one or more ports from the server, the discover response including an address for the network switching device on the network slice of the physical sub-network.

14. The network switching device of claim 10 wherein the network switching device is further configured to receive one or more flow control messages on the one or more ports from the network controller, the one or more flow control messages including configuration information for the management slice of the physical sub-network.

15. The network switching device of claim 14 wherein the one or more flow control messages are compatible with one or more selected from a group consisting of OpenFlow, virtual routing and forwarding, and software defined networking.

16. A method of managing networks, the method comprising:
receiving, by a network controller, an admit request on one or more ports from a first network switching device on a network slice of a physical sub-network, wherein the admit request includes a request for access to a management slice of the physical sub-network and wherein the first network switching device comprises a slave or non-managing network switching device;
forming one or more flow control messages including configuration information for adding the first network switching device to the management slice;
transmitting the one or more flow control messages on the one or more ports to one or more second network switching devices coupled between the network controller and the first network switching device, wherein the one or more flow control messages update a portion of the management slice corresponding to the one or more second network switching devices to add the first network switching device to the management slice, and do not update any other portion of the management slice;
transmitting a first migrate message on the one or more ports to the first network switching device, the first migrate message instructing the first network switching device to exchange management traffic using the management slice of the physical sub-network; and
exchanging management traffic with the first network switching device using the management slice of the physical sub-network.

17. The method of claim 16, further comprising:
booting up;
transmitting a discover request on the one or more ports to a server; and
receiving a discover response on the one or more ports from the server.

18. The method of claim 16 wherein the admit request includes a logon request for the management slice of the physical sub-network.

19. The method of claim 16 further comprising:
monitoring status of the management slice of the physical sub-network; and
transmitting one or more second flow control messages on the one or more ports based on information associated with the monitored status.

20. An information handling system comprising:
a network including a network controller comprising:
a control unit; and
one or more ports coupled to the control unit;
the network controller being configured to:
receive, from a first network switching device, an admit request on the one or more ports from a first network switching device on a network slice of a physical sub-network, wherein the admit request includes a request for access to a management slice of the physical sub-network and wherein the first network switching device comprises a slave or non-managing network switching device;

form one or more flow control messages including configuration information specifying security processing for management traffic on the management slice;

transmit, to one or more second network switching devices coupled between the network controller and the first network switching device, the one or more flow control messages on the one or more ports, wherein the one or more flow control messages update a portion of the management slice corresponding to the one or more second network switching devices to add the first network switching device to the management slice, and do not update any other portion of the management slice;

transmit a migrate message on the one or more ports to the first network switching device, the migrate message instructing the first network switching device to exchange management traffic using the management slice of the physical sub-network; and exchange management traffic with the first network switching device using the management slice of the physical sub-network.

* * * * *